United States Patent Office 3,458,640
Patented July 29, 1969

3,458,640
CONTROL OF VASCULAR TREE DISEASES WITH TRICHLOROPHENYL ACETIC ACIDS
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
Continuation-in-part of application Ser. No. 833,908, Aug. 17, 1959, which is a continuation-in-part of application Ser. No. 692,046, Oct. 24, 1957. This application July 15, 1963, Ser. No. 295,175
The portion of the term of the patent subsequent to June 16, 1981, has been disclaimed
Int. Cl. A01n 5/00, 9/24
U.S. Cl. 424—317          13 Claims This invention relates to the treatment of trees. More particularly this invention is of the treatment of trees to mitigate the effects of Dutch elm disease and oak blight, which may be effected by treatment of the trees with a sublethal amount, which may be a growth-inhibiting or retarding amount of a composition comprising 2,3,6-trichlorophenylacetic acid with other trichlorophenylacetic acids. This application is a continuation-in-part of copending application Ser. No. 833,908, filed on Aug. 17, 1959, now U.S. Patent 3,137,563, which is a continuation-in-part of then copending application Ser. No. 692,046, filed on Oct. 2, 1957, now abandoned.

This mixture of trichlorophenylacetic acids possesses new and unobvious properties not logically predictable from the additivity of the individual activities of the ingredient compounds. Applicants have disclosed in Ser. No. 692,046 the powerful effect the 2,3,6-trichlorophenylacetic acid has on plant life. By contrast 2,4,5- and 2,3,4-trichlorophenylacetic acids have been found to be substantially inactive. It has now been found that mixtures of 2,3,6-, 2,4,5-, and 2,3,4-trichlorophenylacetic acids have plant growth inhibitory activity in excess of that which would be given by the additivity of their individual activities, and in fact this composition exhibits activity as great as the pure 2,3,6-trichlorophenylacetic acid. Such synergistic mixtures have utility as economic substitutes for the pure 2,3,6-trichlorophenylacetic acid for such purposes as tree growth inhibition and treatment of trees to mitigate the effects of or to cure Dutch elm disease and/or oak blight.

The inhibition of tree growth is of importance, for example, in preventing trees beneath or adjacent to power lines or telephone lines from growing into and interfering with such lines. It has also been shown that certain vascular tree diseases such as Dutch elm disease and oak wilt or blight can be combatted by suitable tree growth retardants, such as the present ones, when applied to the trees or loci to be treated, in sublethal amounts. The inhibition of turf growth without destruction of the turf grasses has value in conserving labor otherwise expended on mowing.

The mixtures of the invention are also useful for destroying weeds, as is the pure 2,3,6-isomer. The synergistic mixture of this invention may be prepared by the ring chlorination of phenylacetic acid or by the introduction of a carboxyl group onto the methyl side chain of the mixed trichlorotoluenes made by ring chlorination of toluene or o-chlorotoluene. Such introduction of a carboxyl may be done by photochlorination of the side chain to introduce one chlorine atom, followed by reaction with magnesium in ether and treatment of the resultant Grignard reagent with carbon dioxide, or by other synthetic means.

The proportions of the isomers used is not critical, although the synergistic effect is of no practical importance when one isomer greatly predominates. A preferred range is 40-70 percent of the 2,3,6-, 30-45 percent of the 2,4,5-, and 0-20 percent of the 2,3,4-isomer, such mixtures being inexpensive ones prepared by the method above defined.

The mixtures of the invention may be employed in the free acid form, dissolved or dispersed in a carrier such as water or an organic solvent, or on a solid carrier such as clay or vermiculite. Also, the acids may be employed in the form of their water soluble salts, such as the sodium, potassium, or organic amine salts, and such salts may be used dry or in water solution. The acids of the invention may also be employed in the form of other readily hydrolyzable derivatives such as halides, anhydrides, esters, and amides which become converted to the corresponding acids at the locus of action.

To avoid the complications of field data, we have chosen to present, for the purposes of illustrating our invention, data obtained by the plant growth regulatory bioassay method described in "Test Methods With Plant Regulating Chemicals," U.S. Department of Agriculture Handbook No. 126 (1958), page 58. Briefly this method is as follows: Cucumber seeds are germinated on filter paper pods impregnated with the solution at the desired concentration of the growth regulant to be tested. After the roots of the seedlings of the controls have reached 20-40 mm. in length, the percentage of inhibition of root growth of the treated seedlings is measured relative to the controls. Thus the concentration of the growth regulator required to inhibit root elongation of cucumber seedlings by 50 percent is determined. The tests were carried out substantially as described and the percentage of inhibition of root growth calculated relative to a control without any chemical. The relative activities of the various test compounds are defined as the reciprocal of the 50 percent inhibitory concentration for the test compound divided by the reciprocal of the 50 percent inhibitory concentration for 2,3,6-trichlorophenylacetic acid, and are presented in the table below:

Table I.—Relative growth regulatory activity of trichlorophenylacetic acids as measured by cucumber root elongation tests Compound:                     Relative activity
   (A) 2,3,6-trichlorophenylacetic acid _____   1
   (B) 2,4,5-trichlorophenylactic acid _____   <0.1
   (C) 2,3,4-trichlorophenylacetic acid _____   <0.1
   (D) Mixture of 40% 2,3,6-, 45% 2,4,5- and
       15% 2,3,4-trichlorophenylacetic acid ____   1
   (E) Mixture of 65% 2,3,6-, 35% 2,4,5-trichlorophenylactic acid _____   1

These results are borne out in field tests with the pure 2,3,6- and 2,4,5-trichlorophenylacetic acids and with mixtures of approximately equal amounts of 2,3,6- and 2,4,5- (with traces of 2,3,4-) trichlorophenylacetic acid isomers. At the rates of 1 pound per 100 gallons (as the sodium salts) in water sprayed (to the point of run off) onto the foliage of 6–12' ash trees, equally effective growth inhibition was obtained with pure 2,3,6-isomer and with the mixture, while the pure 2,4,5-isomer was without effect.

In a similar manner other trees, including oaks and elms, are sprayed with 2,3,6-trichlorophenylacetic acid and mixtures of 2,3,6-, 2,4,5-, and 2,3,4-trichlorophenylacetic acid isomers, as described above. The growing of such trees is also retarded. When the trees are afflicted with or subjected to the fungus of Dutch elm disease or oak wilt the effects of these diseases are mitigated and the trees do not succumb.

Amounts of the trichlorophenylacetic acids employed are usually suitably chosen for the tree involved and the purpose intended and the trichlorophenylacetic acids or hydrolyzable compounds thereof are generally from 0.5 to 500 grams per tree of active ingredients. Application need not be on the leaves only and it has been found that the treating composition may be painted onto the tree limbs and trunk, sprayed onto the limbs and trunk, injected into the tree, implanted as a solid in the trunk and limb and/or distributed on or in the ground at the base of the tree. Application may be in aqueous or non-aqueous organic solvent solution or in dispersion, if desired.

The examples which have been described in the foregoing specification have been given for purposes of illustration, not limitation. Many other modifications and ramifications will naturally suggest themselves to those skilled in the art, based on the disclosure of our basic discovery. These are intended to be comprehended within the scope of our invention.

What is claimed is:

1. A method of controlling vascular tree diseases which comprises applying to the external locus of the tree a vascular disease reducing amount sublethal to the tree of a compound selected from the group consisting of 2,3,6-trichlorophenylacetic acid and the water-soluble salts thereof wherein said compound is applied by painting, spraying or distribution on the ground at the base of said tree.

2. The method of claim 1, wherein said compound is 2,3,6-trichlorophenylacetic acid.

3. The method of claim 1, wherein from 0.5 to 500 grams of said compound is applied to the locus of the tree.

4. The method of claim 1, wherein the sodium salt of 2,3,6-trichlorophenylacetic acid is applied to the locus of the tree.

5. A method according to claim 1 wherein the application is to leaves of the tree.

6. A method according to claim 1 wherein the application is to bark of the tree.

7. A method according to claim 1 wherein the application is to ground beneath the tree.

8. A method according to claim 1 wherein the tree treated is afflicted with Dutch elm disease.

9. A method for the control of Dutch elm disease which comprises applying to the external locus of the tree a vascular disease reducing amount sublethal to the tree of a composition comprising a mixture of the water-soluble salts of a mixture of trichlorophenylacetic acids comprising 40 to 70 percent by weight of the water-soluble salts of 2,3,6-trichlorophenylacetic acid, 20 to 45 percent by weight of the water-soluble salts of 2,4,5-trichlorophenylacetic acid, and 0 to 20 percent by weight of the water-soluble salts of 2,3,4-trichlorophenylacetic acid.

10. The method of claim 9, wherein said water-soluble salt is the sodium salt.

11. A method according to claim 9 wherein the application is to leaves of the tree.

12. A method according to claim 9 wherein the application is to bark of the tree.

13. A method according to claim 9 wherein the application is to ground beneath the tree.

References Cited

UNITED STATES PATENTS 3,257,271  6/1966  Smalley.

ALBERT T. MEYERS, Primary Examiner

S. J. FRIEDMAN, Assistant Examiner